United States Patent
Schoene et al.

(10) Patent No.: US 7,065,028 B2
(45) Date of Patent: Jun. 20, 2006

(54) METHOD AND DEVICE FOR GENERATING A CLOCK SIGNAL THAT IS COUPLED TO A REFERENCE SIGNAL

(75) Inventors: Andreas Schoene, Munich (DE); Hartmut Beintken, San Diego, CA (US)

(73) Assignee: Micronas GmbH, Freiburg (DE)

( * ) Notice: Subject to any disclaimer, the term of this patent is extended or adjusted under 35 U.S.C. 154(b) by 0 days.

(21) Appl. No.: 10/239,445

(22) PCT Filed: Mar. 20, 2001

(86) PCT No.: PCT/EP01/03190

§ 371 (c)(1),
(2), (4) Date: Feb. 19, 2003

(87) PCT Pub. No.: WO01/72050

PCT Pub. Date: Sep. 27, 2001

(65) Prior Publication Data

US 2003/0156670 A1      Aug. 21, 2003

(30) Foreign Application Priority Data

Mar. 21, 2000 (DE) ................................. 100 13 933

(51) Int. Cl.
G11B 5/09 (2006.01)
(52) U.S. Cl. ................. 369/59.19; 369/59.2; 369/47.48
(58) Field of Classification Search ............... 369/47.1, 369/47.28, 47.35, 47.46, 47.48, 53.1, 59.1, 369/59.19, 59.2, 59.25, 124.01; 375/355
See application file for complete search history.

(56) References Cited

U.S. PATENT DOCUMENTS

| | | | |
|---|---|---|---|
| 4,799,102 A | 1/1989 | Kobayashi | 358/23 |
| 4,841,357 A | 6/1989 | Gillies | 358/17 |
| 5,206,847 A * | 4/1993 | Kanda | 369/44.13 |
| 5,355,171 A | 10/1994 | Miyazaki et al. | 348/505 |
| 6,269,059 B1 * | 7/2001 | Kuroda et al. | 369/47.28 |
| 6,606,365 B1 * | 8/2003 | Chen | 375/376 |

FOREIGN PATENT DOCUMENTS

| | | | | |
|---|---|---|---|---|
| DE | 40 01 930 | 7/1991 | | 9/64 |
| DE | 0 591 707 | 9/1993 | | |

OTHER PUBLICATIONS

Nillesen, T.: "Digitaler TV-Farbdecoder mit Zeilenverkopplung", Fernesh und Kinotechnik, vol. 40, No. 4, 1986, pp. 141–146, Berlin, Apr. 1986, no day.

* cited by examiner

*Primary Examiner*—Muhammad Edun
(74) *Attorney, Agent, or Firm*—O'Shea, Getz & Kosakowski, P.C.

(57) ABSTRACT

In order to generate a clock signal ($f_{T1}$) that is coupled to a reference signal (FBAS), especially to an analog video signal, a free-running clock pulse ($f_{T1}$) is generated from a high-frequency clock pulse ($f_0$) and the reference signal (FBAS) is digitized therewith. In addition, a second clock pulse ($f_{T1}$) is generated from the high-frequency clock pulse ($f_0$) and the phase deviation between the first clock pulse ($f_{T2}$) and the second clock pulse ($f_{T1}$) is determined. The digitized sampling values of the reference signal (FBAS) at the first clock frequency ($f_{T1}$) are converted, according to the phase deviation determined, into corresponding digitized sampling values having the second clock frequency ($f_{T1}$) and are used as a target specification for generating the second clock pulse ($f_{T1}$) thus coupled to the reference signal.

26 Claims, 1 Drawing Sheet

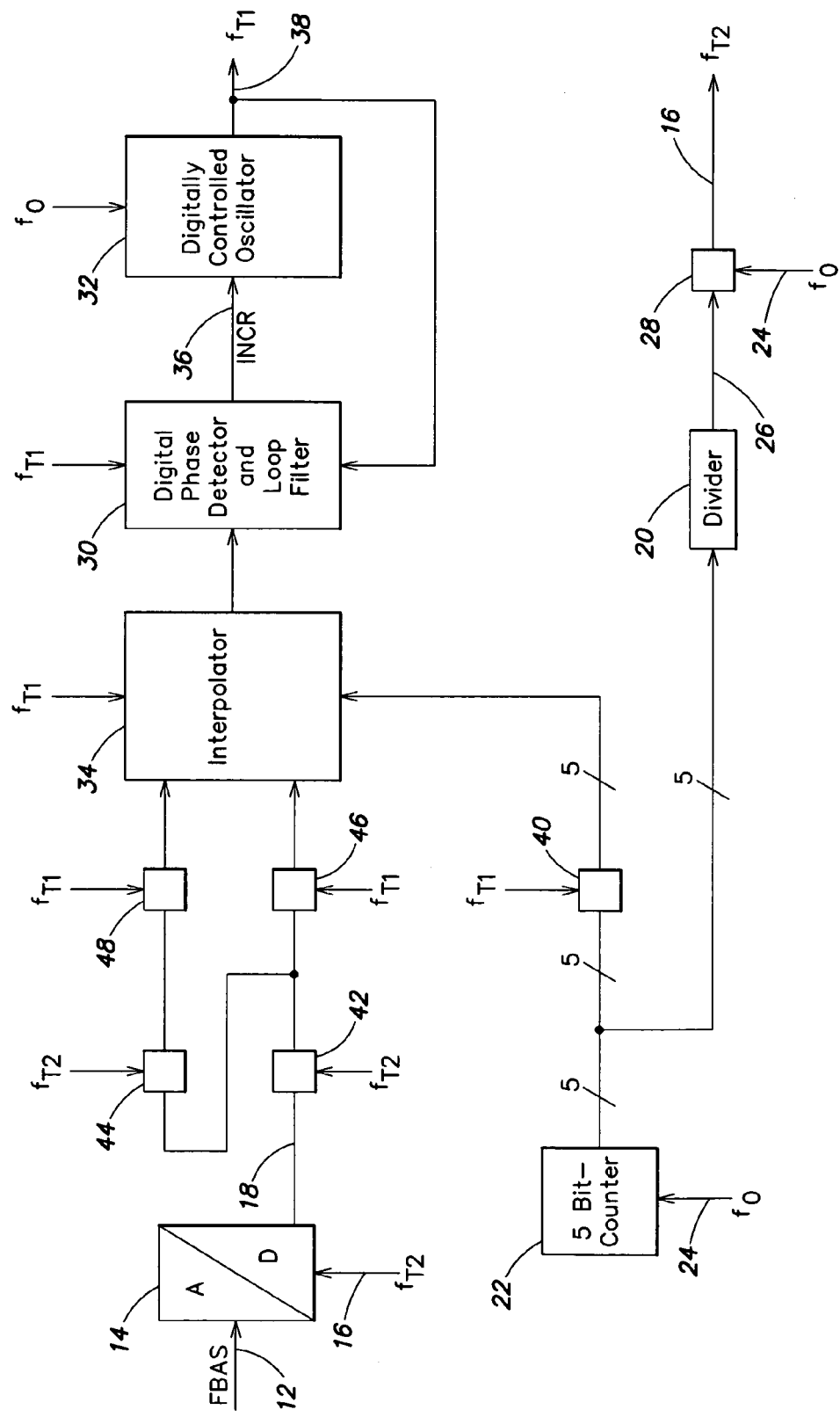

METHOD AND DEVICE FOR GENERATING A CLOCK SIGNAL THAT IS COUPLED TO A REFERENCE SIGNAL

BACKGROUND OF THE INVENTION

The invention relates to the field of generating a clock signal for digital systems, and in particular to a system for generating a line-coupled or color-carrier-coupled system clock signal for decoding a video signal.

In most integrated circuits (ICs) for video processing, especially in the area of digital television, a line-coupled or color-carrier-coupled clock signal is required which is coupled to the analog video signal (e.g., FBAS signal), and thus synchronized with this signal. In principle, two different couplings are possible—line coupling or color carrier coupling. In the first case, the horizontal sync pulses of the video signal are used as the reference for clocking, while in the second case, the color burst of the video signal is used.

Two different approaches are used to achieve the above-referenced coupling. In the first approach, the system clock provided for the respective IC is re-adjusted based on the synchronization signals contained in the FBAS signal. The analog-to-digital converter typically provided to digitize the FBAS signal is operated at the same system clock.

With the second system clock, the respective system, and thus the analog-to-digital converter, are free so that the FBAS signal is sampled asynchronously by the analog-to-digital converter. A digital circuit calculates the deviation between the actual sampling frequency and the virtual sampling frequency coupled to the FBAS signal (so-called skew value), and then corrects the asynchronous sampling values of the digitized FBAS signal.

Due to large-scale integration (e.g., "system on a chip"), it is necessary to accommodate both of the above methods on one IC since each method has advantages for specific system components. However, to use both methods simultaneously, the analog FBAS signal would have to be analog-to-digital-converted twice. The first analog-to-digital conversion is implemented using a free-running clock, that is, with an asynchronous clock signal not coupled to the FBAS signal. The second analog-to-digital conversion is implemented with a coupled and regulated clock signal. Due to its overall complexity, however, this approach is not feasible.

Increasingly, there are applications in which signals digitized at another location, such as FBAS signals or other signals, are already coupled with a clock. Such applications are found, for example, in personal computers in which the system clock is generally fixed and which determine the digitization and data sequence by predetermined processing groups.

There is a need for a system and method for generating a clock signal that is coupled to a reference signal.

SUMMARY OF THE INVENTION

A free-running clock signal and a clock signal coupled to a reference signal are derived from the same (high-frequency and quartz-coupled) clock signal. The resulting pre-knowledge of the phase position of the different clock signals relative to each other may be used to calculate or convert the digitized sampling values of an analog-to-digital converter, operated at the free-running asynchronous clock frequency, to digitized sampling values corresponding to the coupled clock signal. The digital sampling values in turn form the basis for generating or regulating the coupled clock signal.

Advantageously, only a single analog-to-digital converter is required.

A digital phase-locked loop with a digitally-controlled oscillator ("digital timing oscillator," DTO) may, for example, be used to control the coupled clock signal. As a result, analog components, which are technology-dependent and difficult to test, are eliminated in the control circuit. Of course, other systems such as delay lines, et cetera, to output the coupled clock signal are also conceivable.

The conversion of the free-running clock signal of the digital sampling values with the free-running clock frequency from the analog-to-digital converter to corresponding sampling values with the coupled clock frequency may be performed by linear interpolation. The linear interpolation is implemented based upon the determined phase position or phase deviation between the free-running clock signal and the coupled clock signal. The sampling values of the analog-to-digital converter required for interpolation are stored simultaneously with the phase value determined each time in agreement with the coupled clock signal, and fed to a corresponding interpolator.

The invention may be used to generate a clock signal coupled to a television or video signal in the field of digital television. However, the invention is not restricted to this preferred application but may be utilized anywhere there is a need to generate a clock signal coupled to a reference clock signal.

These and other objects, features and advantages of the present invention will become more apparent in light of the following detailed description of preferred embodiments thereof, as illustrated in the accompanying drawing.

BRIEF DESCRIPTION OF THE DRAWING

The FIGURE illustrates a block diagram of system for generating a clock signal coupled to a reference signal.

DETAILED DESCRIPTION OF THE INVENTION

With integrated circuits for video processing such as those used in digital television receivers, it is often necessary to couple the internal clock signals with the received analog video signal (e.g., FBAS signal). In principle, line coupling or a color carrier coupling are possible. In the first case, the horizontal sync pulses of the video signal are used as the reference for clock generation, while in the second case, the so-called color burst of the video signal is used. The following approach assumes that coupling with the horizontal sync pulses of the received video signal is implemented. However, the technique of the present invention is also applicable to color carrier coupling.

An analog FBAS signal on a line 12 is sampled by an analog-to-digital converter 14 driven by a free-running clock frequency $f_{T2}$ on a line 16, to provide a digital FBAS signal on a line 18. This sampling is required for the downstream digital color decoding.

The free-running clock frequency $f_{T2}$ on the line 16 is obtained by dividing a free-running high-frequency and quartz-coupled clock signal having a frequency $f_0$ of at least 600 MHz. The high frequency $f_0$ ensures the phase resolution $1/f_0 < 3$ ns required for 100 Hz television receivers. In this case, $f_0 = 648$ MHz.

In this case, the free-running clock frequency is $f_{T2} = 20.25$ MHz. A divider 20 monitors the state change of the most significant bit (MSB) of a data word generated by a 5-bit counter 22 that is driven by a high-frequency clock frequency $f_0$ on a line 24. The output of the divider 20 on a line 26 is provided to a register 28 that is also clocked at the frequency $f_0$. As a result, the free-running clock signal $f_{T2}$ on the line 16 is equal to $f_0/2^5$, that is 20.25 MHz when $f_0$=648 MHz.

In a digital 100 Hz television receiver, the image must be displayed line-coupled at 36 MHz at the output after a corresponding 100 Hz conversion. To generate this line-coupled clock frequency $f_{T1}$, a digital phase-locked loop is used together with a digital phase detector and loop filter 30, and a digitally controlled oscillator 32, in combination with an interpolator 34. The digital phase detector and loop filter 30 is operated at the coupled clock frequency $f_{T1}$ and determines the phase deviation between the horizontal sync pulses contained in the FBAS signal and the clock signals momentarily generated by the digitally controlled oscillator 32 which are output as the coupled clock signal $f_{T1}$. The phase deviation is converted to an incremental value INCR on a line 36 for the digitally controlled oscillator 32 operated at the clock frequency $f_0$ so that in the adjusted state of the digitally controlled oscillator 32 an output frequency $f_{T1}$ on the line 38 is generated which is matched to the horizontal frequency of the FBAS signal and coupled to it.

Based on the fixed connection between the free-running clock frequency $f_{T2}$ and the coupled clock frequency $f_{T1}$ via the high-frequency quartz clock frequency $f_0$, the phase position between these two clock frequencies may easily be tracked with a resolution of $1/f_0$.

The count of the 5-bit counter 22 provides the momentary phase of free-running clock frequency $f_{T2}$ (20.25 MHz). If the momentary count of the counter 22 is stored with each active clock-pulse edge of coupled clock frequency $f_{T1}$ (36 MHz) in a register 40, this stored value may be used directly to convert the 20.25 MHz sampling values to the corresponding 36 MHz sampling values, since each value stored in the register 40 is a measure of the phase deviation between the coupled clock signal $f_{T1}$ (36 MHz) and the free-running clock signal $f_{T2}$ (20.25 MHz).

For this purpose, the interpolator 34 is provided, already mentioned and operated at the coupled clock frequency $f_{T1}$, to which the respective count stored in register 10 is fed. In the embodiment shown, the interpolator 34 performs a linear interpolation which is sufficient for the considered case of sync recognition. The measurement of two sampling values of the digital FBAS signal provided by the analog-to-digital converter 14 at free-running clock frequency $f_{T2}$ is sufficient for the linear interpolation. For this reason, two registers 42 and 44 operated at free-running clock frequency $f_{T2}$ follow the analog-to-digital converter 14 and store two successive sampling values for the digital FBAS signal. To provide these sampling values to the interpolator 34, the sampling values are stored simultaneously along with the phase value stored in the register 40. This task is performed by the registers 46 and 48 operated at the coupled clock frequency $f_{T1}$ in which one sampling value each is thus stored from the 20.25 MHz system synchronously with the register 40.

In the event the interpolator 34 is to be used to perform not just a linear interpolation but a more-significant interpolation requiring more than two sampling values of the digital FBAS signal, the number of registers operated at the free-running clock frequency $f_{T2}$, as well as the number of registers operated at the coupled clock frequency $f_{T1}$, must be increased.

Based on the interpolation of the FBAS signal sampled at free-running frequency $f_{T2}$, the interpolator 34 determines new digital sampling values for the coupled clock frequency $f_{T1}$. The digital FBAS data stream thus obtained at frequency $f_{T1}$ then serves as the input signal for the digital phase-locked loop, with the result that the line-coupled clock frequency $f_{T1}$ is finally generated by the digitally controlled oscillator 32 which may be in the form of a closed-loop-controlled adder.

Although the present invention has been shown and described with respect to several preferred embodiments thereof, various changes, omissions and additions to the form and detail thereof, may be made therein, without departing from the spirit and scope of the invention.

What is claimed is:

1. A method for generating a clock signal coupled to a reference signal, comprising the steps:
   a) supplying an operating clock signal ($f_0$);
   b) supplying a first clock signal ($f_{T2}$);
   c) supplying a sequence of sampling values of the reference signal at the frequency of the first clock signal ($f_{T2}$);
   d) supplying a second clock signal ($f_{T1}$);
   e) determining the phase deviation between the first clock signal ($f_{T2}$) and the second clock signal ($f_{T1}$); and
   f) converting the sampling values of the reference signal with the frequency of the first clock signal ($f_{T2}$) to corresponding sampling values with the frequency of the second clock signal ($f_{T1}$), the conversion being based on the phase deviation determined in step e), where the resulting sampling values of the reference signal are used in step d) as the target specification to generate the second clock signal ($f_{T1}$) coupled with the reference signal.

2. The method of claim 1, where the first clock signal ($f_{T2}$) and/or the second clock signal ($f_{T1}$) is generated from the operating clock signal ($f_0$).

3. The method of claim 1, where the reference signal is coupled to the first clock signal ($f_{T2}$) or the second clock signal ($f_{T1}$), and the first clock signal ($f_{T2}$) or the second clock signal ($f_{T1}$) is generated from the reference signal.

4. The method of claim 1, where the first clock signal ($f_{T2}$) and/or the second clock signal ($f_{T1}$) is generated from an externally supplied clock signal.

5. The method of claim 4, where the sampling values are generated as digitized sampling values.

6. The method of claim 5, where in step f) an interpolation is performed on the sampling values, provided in step c), of the reference signal at the frequency of the first clock signal ($f_{T2}$), and on the basis of the phase deviation determined in step e), where the interpolated digitized sampling values of the reference signal (FBAS) thus obtained are used in step d) as the target specification to generate the second clock signal ($f_{T1}$).

7. The method of claim 1, where a linear interpolation is performed in step f).

8. The method of claim 1, where the second clock signal ($f_{T1}$) is generated in step d) with the aid of a digital phase-locked loop.

9. The method of claim 6, where a high-frequency quartz-coupled clock signal is used as the operating clock signal ($f_0$).

10. The method of claim 6, where the sampling values of the reference signal supplied in step c) are stored at the frequency of the second clock signal ($f_{T1}$) before their use in the conversion effected in step f), and are subsequently used only for the conversion.

11. The method of claim 10, where in step e) the phase deviation between the first clock signal ($f_{T2}$) and the second clock signal ($f_{T1}$) is determined at the frequency of the second clock signal ($f_{T1}$), and stored synchronously with the digitized sampling values of the reference signal.

12. The method of claim 1, where in step b) the first clock signal ($f_{T2}$) is generated by evaluating the count of a counter operated with the operating clock signal ($f_0$).

13. The method of claim 12, where the momentary count of the counter is determined at the frequency of the second clock signal ($f_{T1}$), and the count determined each time is used in step e) as the measure of the phase deviation between the first clock signal ($f_{T2}$) and the second clock signal ($f_{T1}$).

14. A device for generating a clock signal coupled to a reference signal, comprising:
   a first clock-signal generating device to generate a first clock signal ($f_{T2}$);
   a sampling device operated with the first clock signal ($f_{T2}$) which generates a sequence of sampling values for the reference signal;
   a second clock-signal generating device to generate a second clock signal ($f_{T1}$);
   a phase-deviation determination device to determine the phase deviation between the first clock signal ($f_{T2}$) and the second clock signal ($f_{T1}$), and
   a conversion device to convert the sampling values of the reference signal with the frequency of the first clock signal ($f_{T2}$) to the corresponding sampling values with the frequency of the second clock signal ($f_{T1}$), the conversion being based on the phase deviation determined by the phase-deviation determination device, wherein the sampling values of the reference signal output by the conversion device are supplied to the second clock-signal generating device as the target specification for generating the second clock signal ($f_{T1}$), so that the second clock signal ($f_{T1}$) is output by the second clock-signal generating device coupled to the reference signal.

15. The device of claim 14, where the first clock-signal generating device generates the first clock signal ($f_{T2}$) and/or the second clock signal ($f_{T1}$) from the operating clock signal ($f_0$).

16. The device of claim 14, where the first clock-signal generating device generates the first clock signal ($f_{T2}$) or the second clock signal ($f_{T1}$) from the reference signal.

17. The device of claim 14, where the first clock-signal generating device generates the first clock signal ($f_{T2}$) and/or the second clock signal ($f_{T1}$) from an externally supplied clock signal that specifically corresponds to the first clock signal ($f_{T2}$).

18. The device of claim 14, in which the sampling device comprises an analog-to-digital converter.

19. The device of claim 14, where the conversion device outputs digitized sampling values.

20. The device of claim 14, where the conversion device comprises a linear interpolator.

21. The device of claim 14, where the second clock-signal generating device comprises a digital phase-locked loop that includes a digital phase detector device and a digitally controlled oscillator device, where
   the digitally controlled oscillator device generates the second clock signal ($f_{T1}$), and
   the digital phase detector device determines the phase deviation between the digitized sampling values of the reference signal output by the conversion device and the second clock signal ($f_{T1}$) and, depending thereon, generates a digital incremental value (INCR) for the digitally controlled oscillator device by which to adjust the frequency of the second clock signal ($f_{T1}$).

22. The device of claim 14, where the operating clock signal ($f_0$) comprises a high-frequency quartz-coupled clock signal.

23. The device of claim 14, comprising first memory means for storing the sampling values of the reference signal with the frequency of the second clock signal ($f_{T1}$) output by the analog-to-digital converter, and second memory means for storing the digital sampling values with the frequency of the first clock signal ($f_{T2}$) stored in the first memory means, and to feed the sampling values to the conversion device.

24. The device of claim 14, comprising a counter operated at the operating clock frequency ($f_0$), and the first clock-signal generating device is designed so that the first clock signal ($f_{T2}$) is generated by evaluating the count of the counter.

25. The device of claim 24, where the phase-deviation determination device comprises memory means to determine the momentary count of the counter at the frequency of the second clock signal ($f_{T1}$), and to feed the count determined each time to the conversion device as the measure of the phase deviation between the first clock signal ($f_{T2}$) and the second clock signal ($f_{T1}$).

26. The device of claim 14, where the reference signal comprises a video signal, specifically a television signal, and that the frequency ($f_0$) of the operating clock signal from which the first and/or second clock signal ($f_{T2}$; $f_{T1}$) is derived is at least 600 MHz.

* * * * *

UNITED STATES PATENT AND TRADEMARK OFFICE
CERTIFICATE OF CORRECTION

| | | |
|---|---|---|
| PATENT NO. | : 7,065,028 B2 | Page 1 of 1 |
| APPLICATION NO. | : 10/239445 | |
| DATED | : June 20, 2006 | |
| INVENTOR(S) | : Schoene et al. | |

It is certified that error appears in the above-identified patent and that said Letters Patent is hereby corrected as shown below:

<u>Column 5</u>

In the claims, claim 14, line 29, delete "wherein" and insert --where--

Signed and Sealed this

Fifteenth Day of August, 2006

JON W. DUDAS
*Director of the United States Patent and Trademark Office*